(12) United States Patent
Mitchell et al.

(10) Patent No.: US 9,228,163 B1
(45) Date of Patent: Jan. 5, 2016

(54) SIMPLE, EFFICIENT AUTOMATED ALL-GRAIN BEER BREWING SYSTEM

(75) Inventors: William H. Mitchell, Medina, WA (US); James B. Mitchell, Manteca, CA (US)

(73) Assignee: PICOBREW, INC, Seattle, WA (US)

( * ) Notice: Subject to any disclaimer, the term of this patent is extended or adjusted under 35 U.S.C. 154(b) by 1058 days.

(21) Appl. No.: 13/323,537

(22) Filed: Dec. 12, 2011

Related U.S. Application Data

(60) Provisional application No. 61/449,023, filed on Mar. 3, 2011.

(51) Int. Cl.
C12C 11/00 (2006.01)
C12C 13/02 (2006.01)

(52) U.S. Cl.
CPC ..................... *C12C 13/02* (2013.01)

(58) Field of Classification Search
CPC .............. C12C 1/02; C12C 7/00; C12C 7/04; C12C 7/042; C12C 7/06; C12C 7/205; C12C 9/02; C12C 11/00; C12C 11/006; C12C 13/00; C12C 13/02; C12C 13/025; C12C 13/06; C12C 13/08; C12C 13/10
USPC ............ 99/276–281, 288; 426/11, 16, 28–30, 426/231, 330.3, 507, 520, 592, 600
See application file for complete search history.

(56) References Cited

U.S. PATENT DOCUMENTS

| 941,009 | A | 11/1909 | Cauchois |
|---|---|---|---|
| 2,547,481 | A | 4/1951 | McDonald |
| 2,761,200 | A | 9/1956 | Arnett |
| 2,830,528 | A | 4/1958 | Arnett |
| 3,563,157 | A | 2/1971 | Lenz |
| 4,503,502 | A | 3/1985 | Chapin |
| 4,557,186 | A | 12/1985 | Brown |
| 4,751,875 | A | 6/1988 | Wooten |
| 4,754,696 | A | 7/1988 | Sarazen et al. |
| 4,754,698 | A | 7/1988 | Naish |
| 4,790,239 | A | 12/1988 | Hewitt |
| 5,158,793 | A | 10/1992 | Helbling |
| 5,265,518 | A | 11/1993 | Reese et al. |
| 5,311,811 | A | 5/1994 | Kuzyk |
| 5,865,093 | A | 2/1999 | Wasmuht |
| 5,970,846 | A | 10/1999 | Roehr |
| 6,032,571 | A | 3/2000 | Brous et al. |
| 7,963,213 | B1 | 6/2011 | Murdock |
| 8,993,273 | B1 | 3/2015 | Blichmann |
| 2001/0035097 | A1 | 11/2001 | Shaanan et al. |
| 2003/0019031 | A1 | 1/2003 | Mosis |
| 2009/0246341 | A1* | 10/2009 | Pitner ....................... A23F 3/16 426/435 |
| 2010/0236949 | A1 | 9/2010 | Vacca et al. |

(Continued)

*Primary Examiner* — Dana Ross
*Assistant Examiner* — Brandon Harvey
(74) *Attorney, Agent, or Firm* — Russell Krajec; Krajec Patent Offices, LLC

(57) ABSTRACT

The present invention provides a method to create and a process for using a compact, automated, all-grain beer brewing appliance. The method may include a microprocessor-based Process Control System, a Heat EXchanger loop, a Fluid Distribution Manifold, a Step Filter Basket, a Hot Fluid Tank, pumps, valves, plumbing and brewing control instruments. The invention may also make use of a Filter-Keg in lieu of a Hot Fluid Tank allowing fermentation, conditioning and dispensing from a single replaceable vessel.

8 Claims, 8 Drawing Sheets

(56) References Cited

U.S. PATENT DOCUMENTS

2014/0017354 A1 1/2014 Joseph et al.
2015/0000530 A1 1/2015 Mitchell et al.
2015/0000531 A1 1/2015 Mitchell et al.
2015/0000532 A1 1/2015 Mitchell et al.

* cited by examiner

SIMPLE, EFFICIENT AUTOMATED ALL-GRAIN BEER BREWING SYSTEM

RELATED APPLICATION

This application claims priority from provisional application Ser. No. 61/449,023, filed Mar. 3, 2011.

BACKGROUND

Field

This invention relates to methods and systems used in the creation of a simple-to-use, precise and efficient automatic all-grain beer brewing system.

Conventional beer-brewing is a several thousand-year-old multi-step process that leverages natural chemical reactions with raw ingredients that include water, yeast and typically barley and hops to produce alcohol and carbon dioxide. The time-honored conventional steps prior to brewing involve "malting" whole-grain barley (or other grains) and then roasting the grain to various degrees and cracking it in a coarse fashion.

The actual brewing process consists of steeping the cracked, roasted, malted grain in water at a temperature (typically around 150E-160F) calculated to release sugars of the right type and amount for the beer recipe being followed. This process is commonly referred to as mashing. This steeped fluid (known as sweet wort) is then separated from the spent grain in a process known as lautering. Lautering typically involves filtering and rinsing or sparging the grain to capture as much of the sugars as possible.

The sweet wort collected from the mash is then boiled and reduced with (typically) hops as well as other ingredients referred to as adjuncts to trigger chemical reactions that impart bitterness, flavors and aroma. It is not unusual to have a requirement that each one out of a set of adjuncts be added at a different point in the brewing cycle, thereby complicating efforts to automate the process. After the brewing process is completed, the hot wort is cooled to room temperature, at which time yeast is added to start the fermentation process. Fermentation, which typically takes place in a separate air-proof vessel, is the process by which the sugars in the beer wort are converted to alcohol and carbon dioxide, and typically takes from one week to more than a month, depending on the style of beer and recipe used.

Beer-brewing is typically performed by qualified expert brew-masters using a variety of specialized equipment and techniques to achieve satisfactory predictable, repeatable results. Commercial and craft brewers employ a minimum of five main vessels in their production of beer, as shown in FIG. 1. The horizontal path shows the flow of fluids, while the vertical arrows highlight the ingredients added at each stage, as traditional brewing is usually an additive process.

DESCRIPTION OF THE RELATED ART

Although commercial and craft breweries typically employ the process described previously (all-grain brewing) and even incorporate additional process steps and further refinement, home brewers most often learn to brew using a simplified approach called extract brewing. With the wider availability over the past decade of liquid and dry malt extract produced from grain mashing and an evaporation process, home brewers sometimes simplify their brewing process by eliminating the mashing step, and just boiling malt extract with hops and adjuncts, then fermenting and bottling (or kegging) their beer. Most commercial breweries still perform some amount of grain mashing themselves to impart preferred and specialized flavors and/or reduce cost. Extract brewing's inherent simplicity has enabled a host of simple home-brewing systems such as Mr. Beer™, and plays a central role in most brewing process and machine inventions to date. All-grain brewing, in contrast, remains a very traditional process, only modestly improved and automated through the use of technology.

Home-brewers who practice all-grain brewing, which follows the typical flow described in FIG. 1, employ multiple large vessels. A large stainless-steel pot is frequently used as a hot water tank and a separate one is often used for the boil kettle. A large plastic pail, glass carboy, or stainless steel conical vessel is then used as a fermentor. Heat is typically applied directly via a propane burner to the hot water tank and boil kettle. The mash tun most often used by home-brewers is a large-capacity cooler with a filtering device connected to its outlet spigot. Hot water is added to the mash-tun cooler at the start of mashing, and then, later, during sparging as well. Sometimes a metal pot with a false bottom or other filtering device is used for mashing, with direct heat applied to maintain mash temperature. This has the potential advantage of avoiding the temperature drop common with mash-tun coolers, but at the cost of difficulty in maintaining proper heat to produce a constant mash temperature Because all-grain brewing does lend itself to a much broader set of more authentic and nuanced results at a lower cost, many advanced home-brewers do gravitate toward all-grain brewing, or at least mini-mash brewing which uses malt extracts, but also includes a reduced mash step. To reduce the considerable time and energy required to create satisfactory, repeatable results using an all-grain brewing setup, advanced brewers often attempt to partially automate the important mashing process to improve simplicity, consistency and repeatability. Advanced home-brewers sometimes custom-build RIMS-based (Recirculating Infusion Mash System) or HERMS-based (Heat Exchanger Recirculating Mash System) home-breweries (FIG. 2), and several home-brewing suppliers offer complete brewing systems based on these approaches. Such systems either use direct heat and a pump, in the case of RIMS or indirect heat through a heat-exchanger and a pump to recirculate the mash fluids thereby maintaining a constant temperature and at the same time affording mixing and filtering of the wort to achieve high-efficiency extraction of sugars.

Several manual, semi-automated and fully-automated extract brewing approaches and systems have been described in the literature and previous patent applications. Also, many all-grain breweries have been constructed using classic additive brewing techniques, sometimes in conjunction with modern RIMS or HERMS approaches. To date no fully automated all-grain brewing process and system has been invented that simplifies the beer brew process to the point that the novice may create high-quality, repeatable results without manual intervention, and with an efficiency that meets or exceeds that of commercial breweries in a compact, form.

SUMMARY

The present invention provides a method and mechanism used in the creation of a simple-to-use, precise and efficient automatic all-grain beer brewing system. The mechanism may include an enclosure, a heat-exchanger loop, a fluid distribution manifold, a step filter basket, a hot-fluid tank, a process control unit, a plurality of instruments, a plurality of affecters (e.g. relays and automated valves), pumps, plumbing components and electrical wiring.

The methods, features, and advantages of the present invention will be apparent to those skilled in the art from the following detailed description of the preferred embodiment and the illustrations.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF FIGURES

The systems and methods described herein may be understood by reference to the following figures.

DETAILED DESCRIPTION OF THE PREFERRED EMBODIMENTS

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather to provide an understandable description of the invention.

The terms "a" or "an," as used herein, are defined as one or more than one. The term "another," as used herein, is defined as at least a second or more. The terms "including" and/or "having", as used herein, are defined as comprising (i.e., open transition). The term "coupled" or "operatively coupled," as used herein, is defined as connected, although not necessarily directly and mechanically. The term "set" as used herein may refer to a set that has a single member only, as well as to sets with multiple members.

Figure 3:
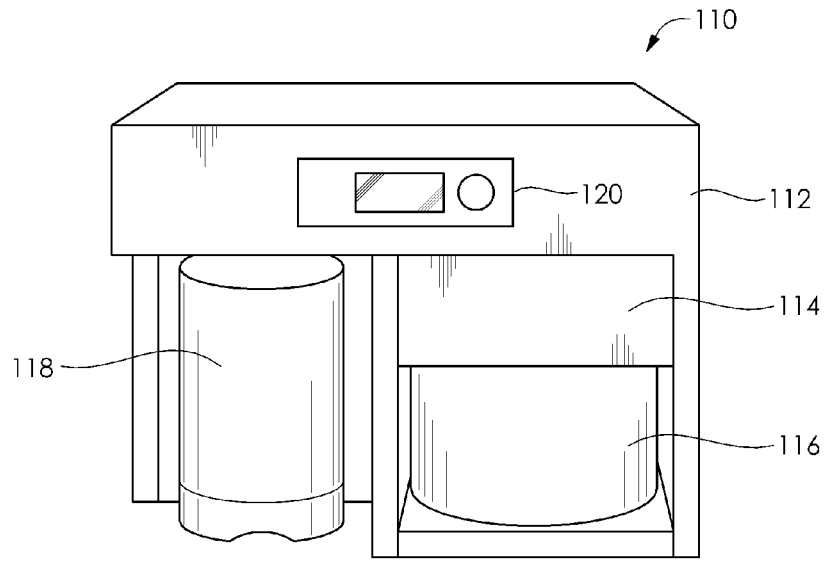
FIG. 3 illustrates an external view of one preferred embodiment of the automated all-grain brewing system.

Referring to FIG. 3, in a preferred embodiment of a beer making system 110, includes a stainless-steel and plastic enclosure 112 that houses a slide-out Step-Filter Basket (SFB) 114 that rests above a Hot Fluid Tank (HFT) 116. In this embodiment the housing is recessed on the left side, as shown, to allow a small fermentation vessel 118 to be attached and to slide in and out conveniently. In this preferred embodiment the Process Control Unit (control unit) 120 is centered in the enclosure.

Figure 1:
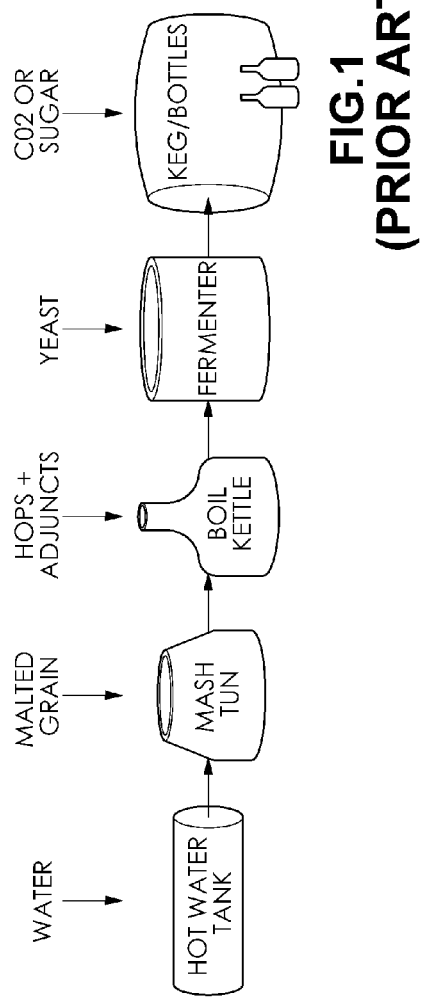
FIG. 1 is an illustration of a prior art beer producing apparatus and method.
Figure 2:
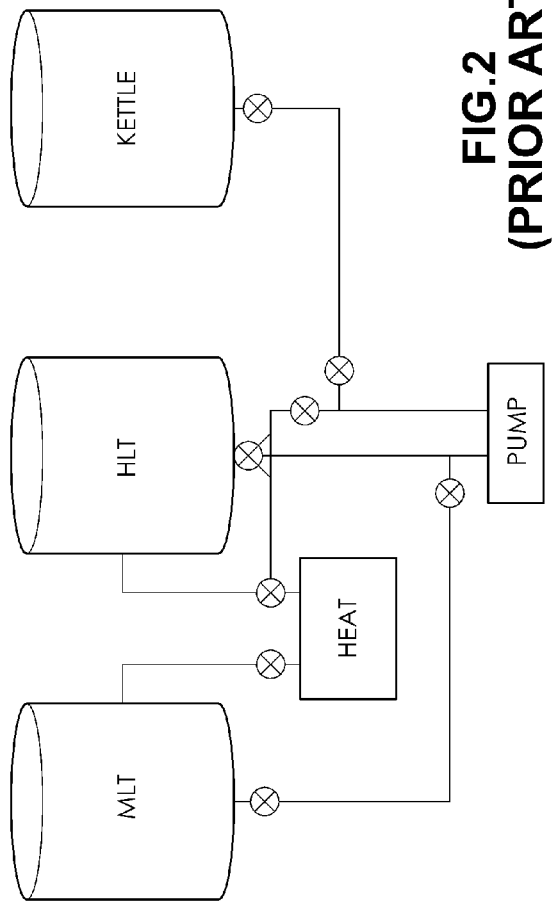
FIG. 2 is an schematic illustration of a prior art Heat Exchanger Recirculating Mash System
Figure 4:
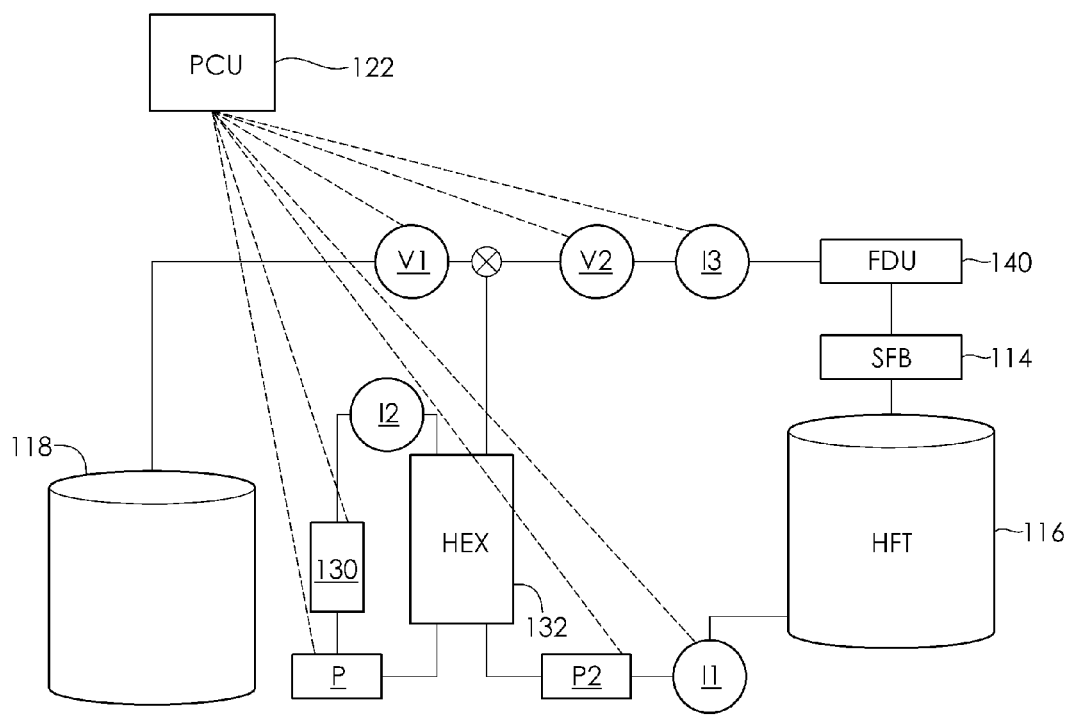
FIG. 4 shows a diagrammatic view of the brewing system of FIG. 3.

Referring to FIG. 4, the software of the control unit 120 directs a process of fluid flow around the system (FIG. 4) which affects the brewing process. The system pumps heating fluid through a closed loop path over a heating element 130 on the left side of a heat exchanger 132, which then transfers heat to the right side through heat exchanger 116. Pump $P_2$ pumps water and beer wort through heat exchanger 116, which heats these fluids while avoiding direct contact with the heating element 130, in common with HERMS systems (FIG. 2). These fluids then flow through automatic valve $V_1$ or valve $V_2$. When valve $V_2$ is open and valve $V_1$ is closed, fluid flows through a set of Instruments $I_3$ into a fluid distribution unit 140.

Figure 5:
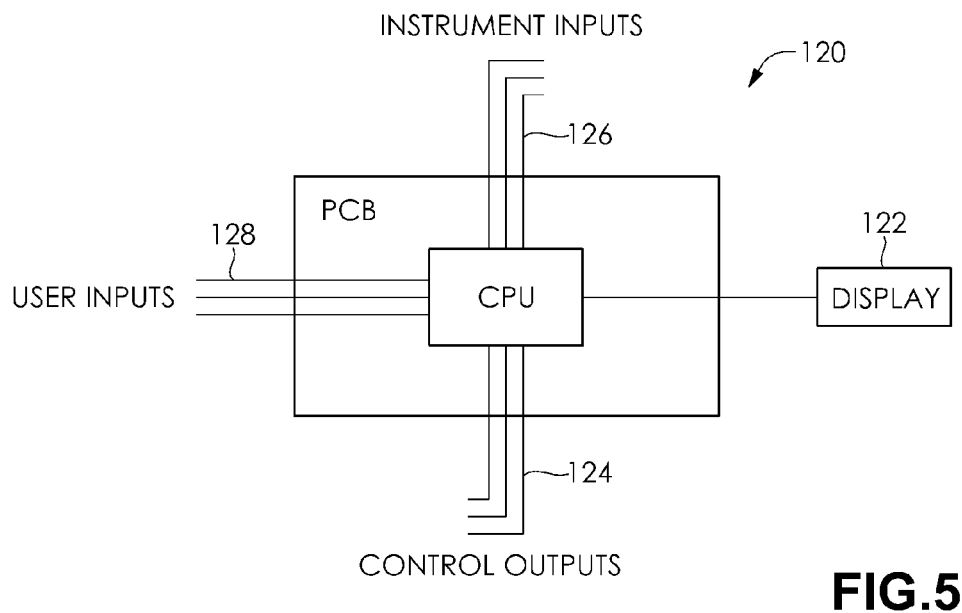
FIG. 5 is a diagram of the control unit for the system of FIG. 3.

Referring to FIG. 5, the brewing process is controlled and monitored by the control unit 120 and the control software being run. The control unit control software directs the brewing process by driving a set of control output lines, typically through control relays (not shown), to drive valves V1, and V2, pumps P and P1, and heating elements 130 (FIG. 4). The control unit software monitors the brewing process through instrument input lines 126 which provide data such as temperature, flow rate, specific gravity and color. User control and process observation is enabled through the user inputs 128 and the display 122, respectively. In a preferred embodiment, the control unit consists of one or more microprocessors such as an Atmel ATMEGA part on a printed circuit board or boards, together with supporting circuitry and components.

Figure 6:
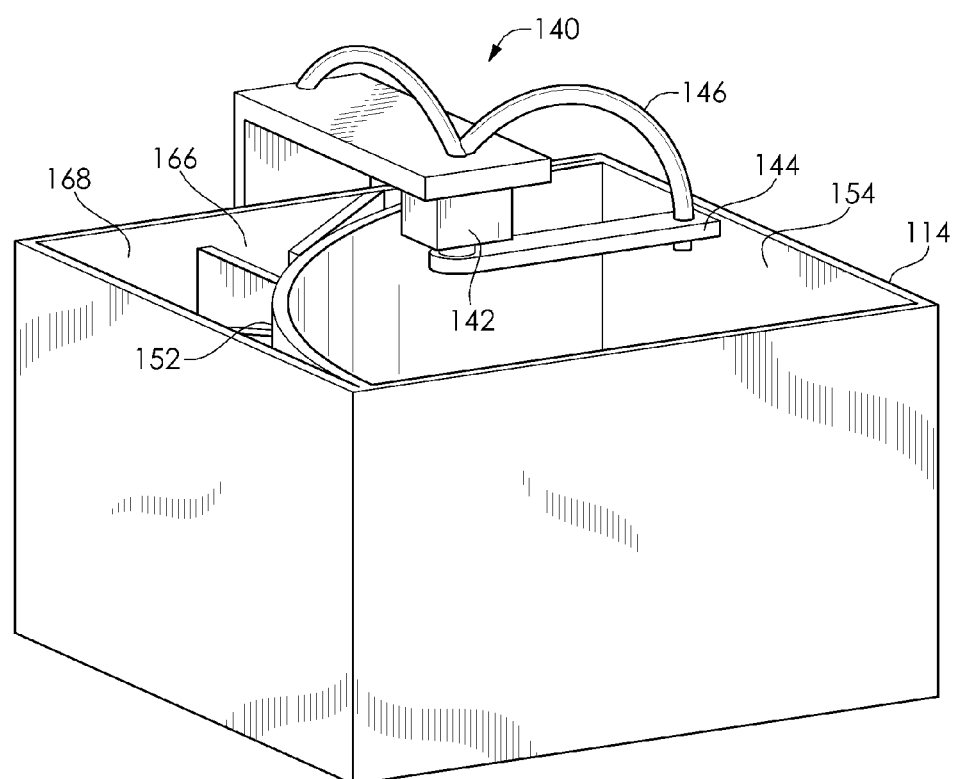
FIG. 6 is a perspective view of a portion of the system of FIG. 3, illustrating the fluid distribution unit which directs fluid (water and beer wort) into the appropriate compartment of the step filter basket below it under control of the control unit and control program.
Figure 7:
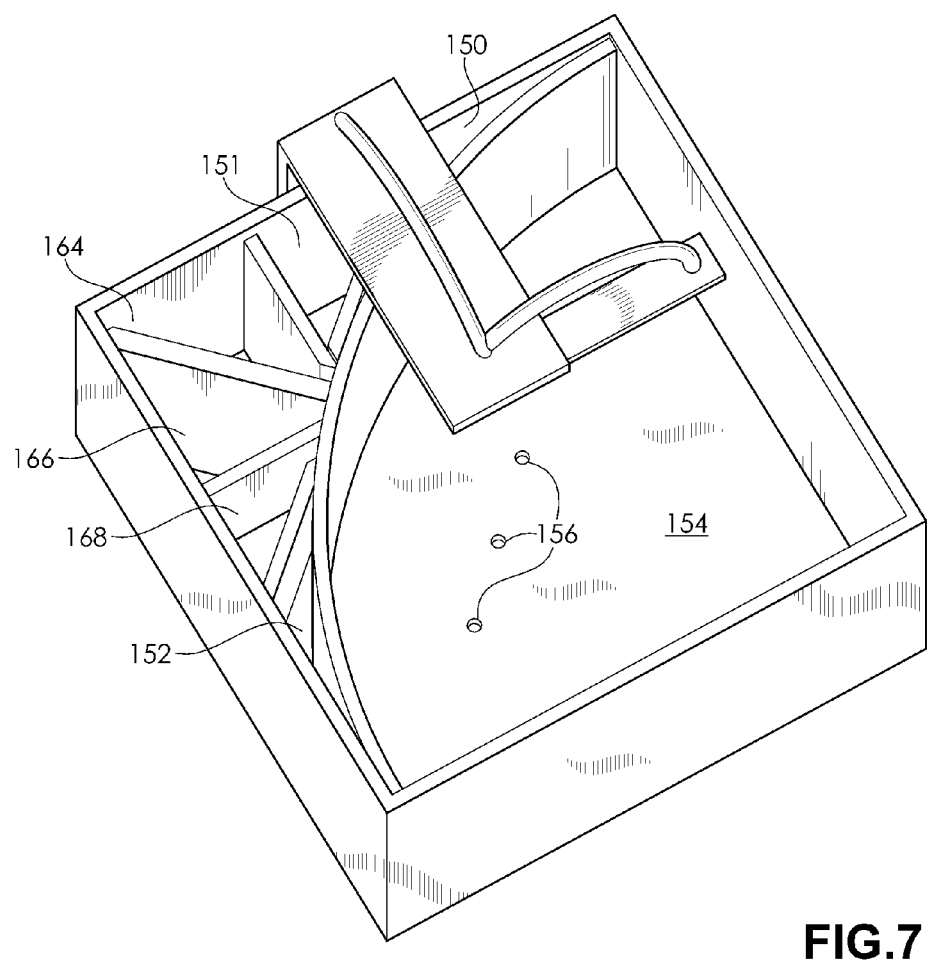
FIG. 7 is a perspective view of the portion of the system of FIG. 3, shown at a higher angle.

Referring to FIGS. 6 and 7, fluid distribution unit 140 includes a stepper motor 142, under control of the control unit 120, which precisely positions arm 144, which, in turn, moves a flexible silicone hose 146 over a specific compartment of a set of compartments 150, 151, 164, 166, 168 and 152 in the basket 114. Fluid directed by distribution unit 140 into flow-through compartments 150 and 152 merely passes through directly into hot fluid tank 116 to be pumped back through the heat exchanger 132, where it is heated, and then circulated once again.

To accomplish the systems version of mashing, the control unit 120 directs the distribution unit 140 to move the hose over malted grain compartment 154. Compartment 154, the largest of the compartments, is filled with cracked, malted grains, either in a filter bag or in a loose state. The compartment fills with hot water, which is transformed into sweet beer wort by this process. The drain holes 156 on the bottom of the compartment do not drain as fast as fluid is transferred (via the distribution unit 140) into the compartment 154, so eventually the fluid level reaches and spills over the outer portions of the walls of the compartment that are interior to the step filter basket 114, as shown in FIG. 9.

Figure 8:
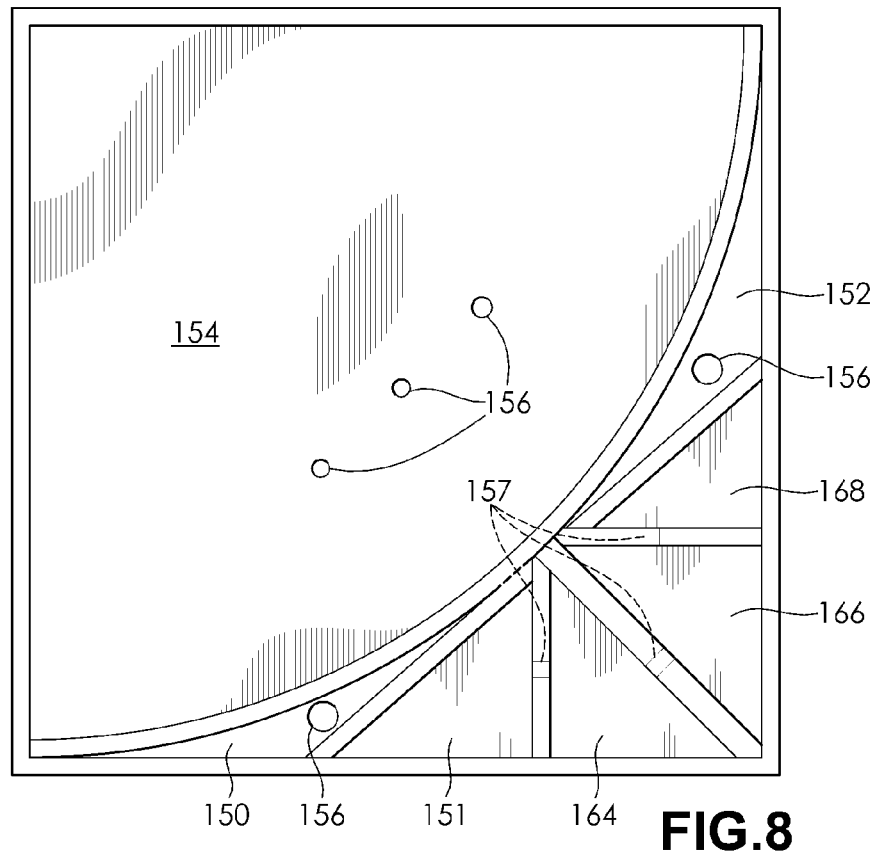
FIG. 8 is a top view of the step filter basket, which forms a portion of the system of FIG. 3.
Figure 9:
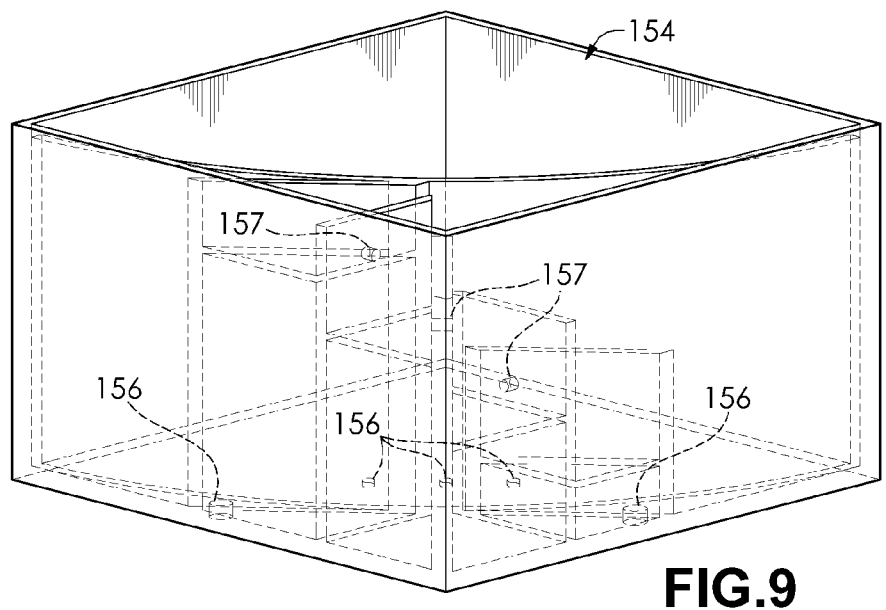
FIG. 9 is a perspective view of the step filter basket of FIG. 8.
Figure 10:
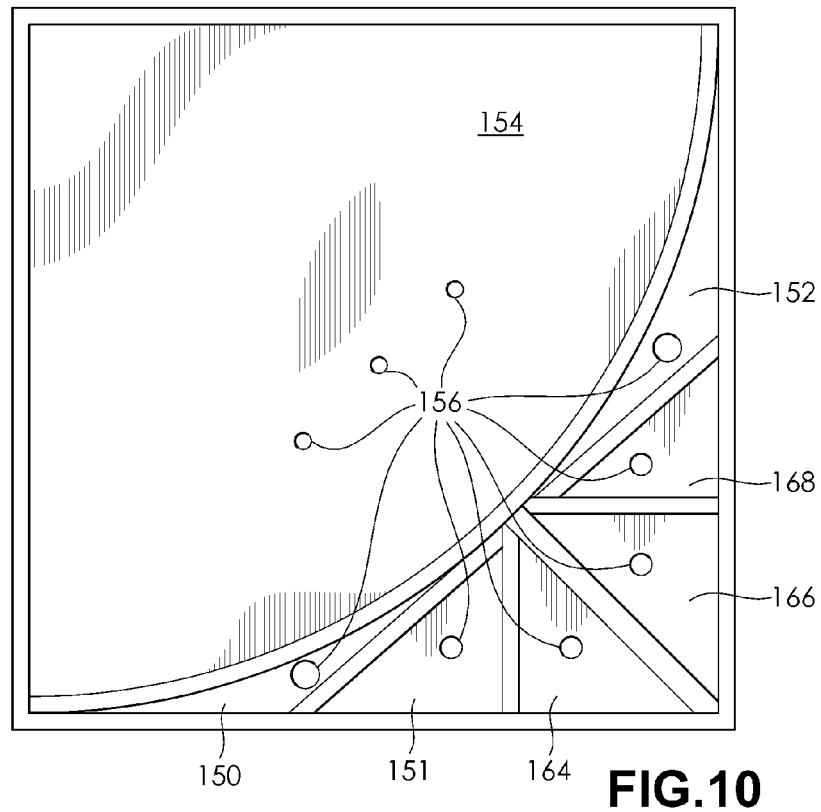
FIG. 10 is a top view of an alternative embodiment of a step filter basket.

In one preferred embodiment, shown in FIGS. 8 and 9, the bases of the smaller compartments are stepped, with drain holes in the side-wall in common with the next counterclockwise compartment. In another preferred embodiment best shown in FIGS. 10 and 11, all compartments have drain holes 156 in their bases, the bases of the compartments are not stepped, and they do not have drain holes 157 in their walls. In both preferred embodiments hot wort flows over the walls of adjacent compartments, or equivalently, through holes near the top of the walls of adjacent compartments. In these preferred embodiments, the step filter basket 114 is constructed from a high-temperature, dishwasher-safe food-grade plastic such as polycarbonate.

Figure 13:
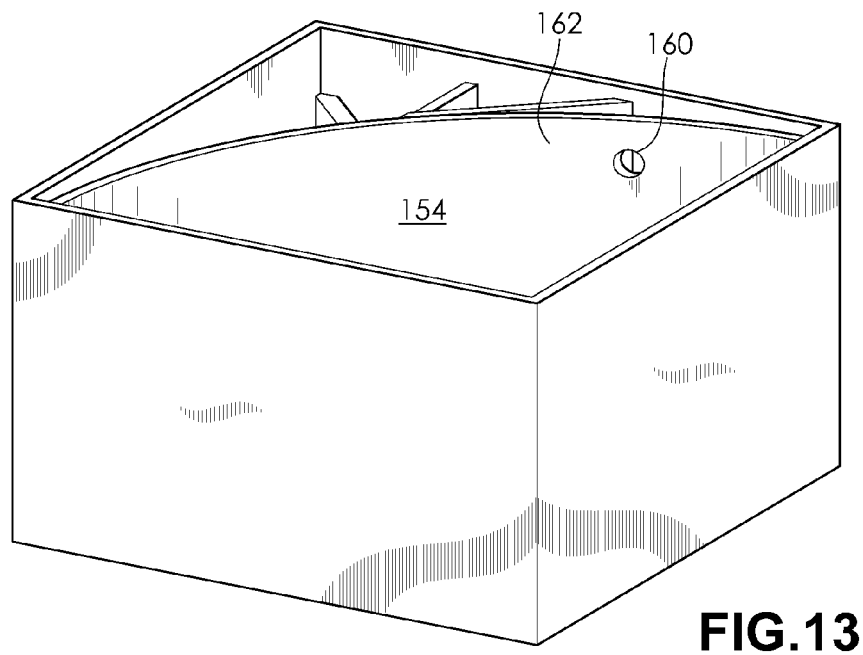
FIG. 13 is a perspective view of an alternative embodiment of a filter basket.

During mashing fluid escapes from compartment 154 to compartment 150 and 152, either through a hole 160 in the wall 162 between the compartments, as shown in FIG. 13, or, alternately (in an embodiment that is not shown), due to the wall between compartment 154 and compartments 150 and 152 being slightly lower at the outer edges than the other compartment walls. Sweet beer wort continues to fill compartment 154 during this brewing step. No matter how fast compartment 154 is filled, however, the fluid level remains constant, because it will spill into compartments 150 and 152 and be drained into tank 116. In an alternate preferred embodiment compartments 150 and 152 may be joined into a common drain compartment, and drain holes 156 in the bottom of the large compartment 154 and drain holes in the smaller compartments 151, 164, 166, 168, 152 of the step filter basket may then be replaced instead by drain holes near the bottom of the walls of compartments 150 and 152, to direct all fluid flow into the common drain compartment. In this preferred embodiment a single larger drain hole in the bottom of the step-filter basket located in the common drain compartment may then replace multiple smaller drain holes in the bottom of the filter basket, simplifying the collection of fluid that passes through.

This system's equivalent of the conventional brewing boil step is accomplished by the control unit 120 directing the distribution unit 140 to move its arm 144 over an adjunct compartment 168 which is the first of several adjunct compartments 168, 166, 164 and 151 (FIGS. 7-13). One or more of these adjunct compartments are typically filled with hops, flavoring elements and clarifiers.

Figure 14:
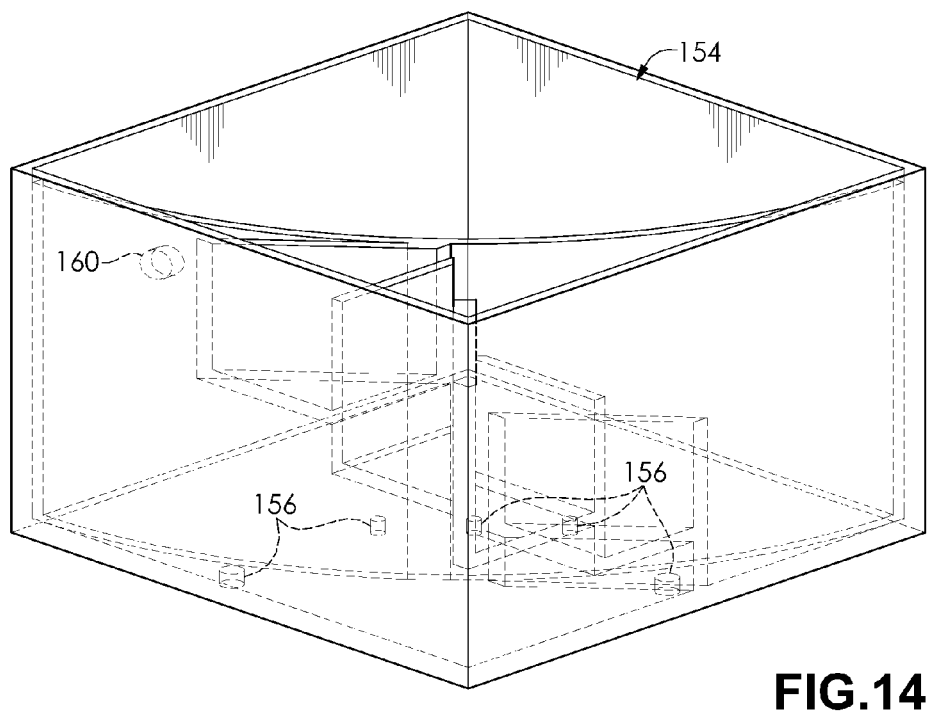
FIG. 14 is a perspective view of the filter basket of FIG. 13, with arrows showing the direction of fluid flow.

Hot beer wort is directed over these compartments in succession, for varying time intervals, depending on the preferred sequence of adjunct additions in the recipe being brewed, as implemented by the control unit 120 software. As depicted in FIG. 14, as each of these adjunct compartments is being filled, fluid eventually overflows into the next counter-clockwise compartment, initially from compartment 168 into drain compartment 152. When we reach each successive step in the brewing program, fluid cascades from 166→168→152, then from 164→166→168→152-, and finally from 151→164→166→168→152.

Not all recipes will call for 4 different brewing adjuncts to be used, hence fewer steps in the cascade may actually take place in practice. Preferred embodiments of the filter basket 114 containing more adjunct compartments may be used enabling recipes with more adjunct ingredients. A two-adjunct beer recipe will only include adjuncts in compartments 168 and 166, and the distribution unit 140 will never direct fluid into the remaining compartments clockwise for this recipe. Small drain holes in the bottom and/or lower sides adjacent to the next counter-clockwise brewing compartment allow for slow drainage of the beer wort from 152 into the tank 116. The distribution unit 140 fills adjunct compartments 168, 166, 164, and 151 at a faster rate than they drain through these small holes, so each compartment in succession fills to the height of its lowest wall or high-wall drain and then overflows to cascade into the next counter-clockwise compartment.

Brewing Process Using Invention

Conventional all-grain beer brewing follows a multi-step process using multiple vessels and adding ingredients over time. For example, in the mash process step, cracked malted grain is added to a mash-tun, and during the boil phase hops and other flavorings are added to the boil pot in sequence. The process described in this invention allows for the same beneficial brewing reactions to take place and authentic all-grain product results to be achieved, yet allows for the simple pre-loading of ingredients into the step filter-basket prior to the start of brewing, eliminates the addition of ingredients either automatically or by-hand during the brewing process, and automates and simplifies brewing under precise computer process control.

Before the start of brewing, the user disconnects the hot fluid tank 116 from its coupling to the system 110, fills it with water from a tap or other water supply to an indicated fill level, then re-couples the tank to the system.

At this point the step filter basket 114 is removed from the system to pre-load it with recipe ingredients, either loose or pre-packaged. Loose ingredients may be loaded into filter bags designed to fit, in a preferred embodiment, the wedge shapes of the individual compartments. Pre-packaged ingredients, in a preferred embodiment, come sealed within filter-mesh packages appropriate for the ingredient and/or matched to the recipe.

Once the filter basket 114 has been pre-loaded with ingredients and replaced into the frame of the system, power is applied and the user interface of the system is presented on the display 120. The user, via touch-screen controls in a preferred embodiment, or using a rotary encoder, buttons or other UI means, then selects a recipe. Although common recipes may be included with the control programs of the system, they may also be created by the user or downloaded from the internet.

A recipe in a preferred embodiment includes at least a Mash Schedule, a Boil Time and an Adjunct Schedule that corresponds to the adjuncts called for in the recipe. The Mash Schedule specifies the temperature to heat mash fluid to as it floods/overflows the grain compartment (basket 114 compartment 154). Mash temperatures and time periods to hold these temperatures, called rests, correspond to the mash temperatures and rests used in conventional all-grain beer brewing. The Boil Time corresponds to the boil-time of a conventional brewing process, while the Adjunct Schedule specifies the times or other trigger conditions during the brewing process at which the distribution unit 140 is required to direct fluid flow to a particular adjunct compartment.

After a recipe is selected and the start of brewing is triggered by the user, the system will cycle through the following brewing steps:

1. Heating water to the initial Mash Schedule mash temperature
2. Mashing grain according to a Mash Schedule
3. Heating the wort to Boil Temperature
4. Boiling the wort with adjuncts according to an Adjunct Schedule
5. Cooling the wort Water is heated up to mash temperature by pumping it through the heat exchanger 132 into the fluid distribution unit 140, which directs the flow into compartment 150, directly down into the tank 116. The water is pumped around this loop continuously as heat is applied from the heating element 130 indirectly through the heat exchanger 132, until the water temperature reaches the initial mash temperature specified in the Mash Schedule for the recipe.

When the water reaches the temperature specified in the Mash Schedule of the recipe the control unit 120 software controlling the arm 144 positions it over malted grain compartment 154 and begins to direct fluid into this compartment which fills and overflows on the edges into into drain compartments 150 and 152. During this brewing step mash fluid completely submerses the grain that has been loaded in compartment 154, steeping the grain in hot water, held to a temperature specified by the Mash Schedule. This recirculation heating mash process maintains very constant temperatures and recirculating hot wort is filtered through the grain bed. In addition, ingredients may be packaged in filter mesh and the filter basket 114 bottom holes 156 may be covered in varied in size, shape, and pattern and/or covered in filter mesh, thereby providing additional filtering and extraction benefits.

In the next step of the brewing process the control unit 120 drives the distribution unit 140 to direct fluid into compartment drain compartment 152 in the step filter basket 114. Mash fluid falls through compartment 152 in the directly into the tank 116, to be pumped back through the heat exchanger 132, heated, and then directed back through the distribution unit 140 again. Sweet wort is heated rapidly during this process to the boil temperature specified in the recipe, typically a temperature above 190° F. to both sterilize the wort and wort path and to trigger the requisite brewing reactions.

Figure 11:
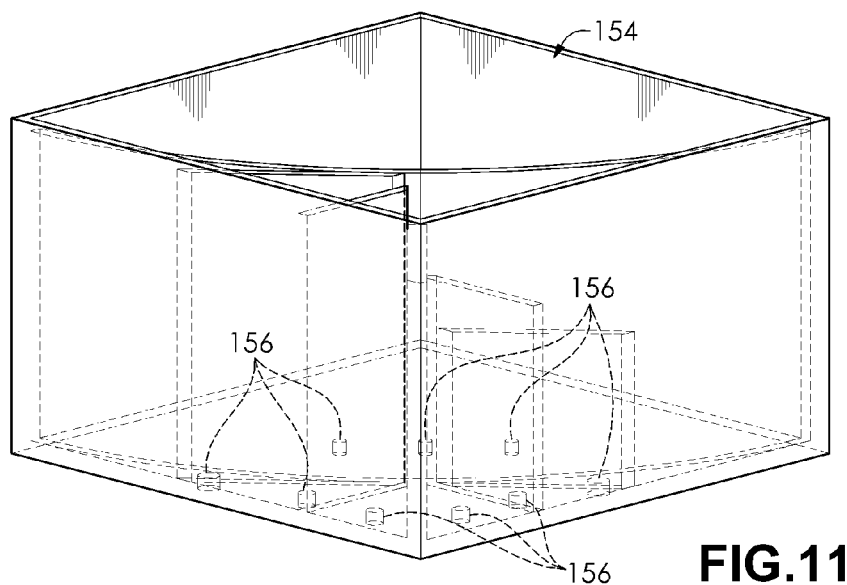
FIG. 11 is a perspective view of an alternative embodiment of a step filter basket.
Figure 12:
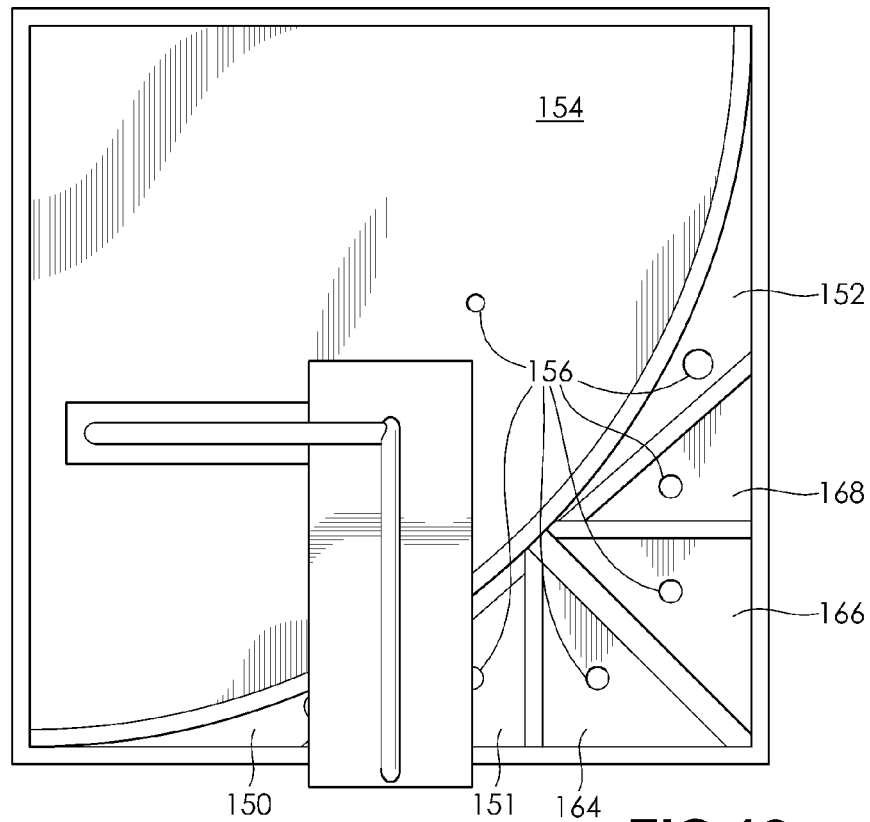
FIG. 12 is a top view of the filter basket of FIG. 8, also showing the fluid distribution unit.

When the boil temperature has been reached, the control unit 120 directs the fluid into compartment 168, starting the boil step of the brewing process. Filter basket 114, compartment 168, the first adjunct compartment, contains the first ingredient to be "added" to the hot wort, which typically is hops used for bittering the beer, but may instead (or also) contain other adjuncts such as clarifying agents or flavorings. Since the drain holes in the bases of all adjunct compartments (in this preferred embodiment, compartments 168, 166, 164, and 151) are small, these compartments fill up quickly until beer wort overflows the top of the compartment's lowest wall, or through a hole near the top of its wall with the next counter-clockwise oriented compartment (FIGS. 9 and 11). In this way, adjuncts in adjunct compartments are sequentially added to the group being steeped in the beer wort, with a result similar to that achieved by sequentially adding adjuncts into a boil pot in conventional brewing.

During the boil phase the control unit software may direct the distribution unit 140 to move to the next clockwise adjunct compartment in sequence (filter basket 114 compartment 166, 164, 151) and steep the adjuncts in each of these compartments with hot fluid. Each of these compartments typically contains hops or other adjuncts that would normally be added to the boil pot in a conventional brew process. As the control unit controls the distribution unit 140 to direct wort flow over these adjunct compartments at times called for in the adjunct schedule, wort fills up the compartment into which the fluid is directed, then cascades over the wall (or through a hole in the wall) with its nearest counterclockwise neighbor. This cascade happens continuously until the wort finally cascades into compartment 152 and into the fluids tank 116 below. This continuous waterfall over stepped adjunct compartments enables an additive brewing process that replaces the sequential dropping of ingredients into the boil.

When the boil phase has been completed the wort cooling phase is entered. During this phase wort may be recirculated through an additional cooling loop such as fan-based cooler or a thermoelectric plate cooler coupled to the heat exchanger, to reduce wort temperature to yeast pitching temperature.

In another preferred embodiment the cooling phase is skipped, although an aeration step may still be employed, and hot wort is dispensed directly into a waiting fermenter, thereby sterilizing it. The fermentor may then be actively (e.g. through the use of a cooling plate) or passively cooled to yeast pitching temperature. In still another preferred embodiment hot fluids tank 116 and Fermentor 118 are combined, typically in a keg vessel, and hot wort is just allowed to cool in-place in said vessel. This preferred embodiment has the benefit of eliminating both the hot fluids tank 116 and the valves V1 and V2, but may require use of an additional pump in place of valve V2 to help circulate fluid to/from 118.

The brewing process is concluded by the addition of yeast to room-temperature wort. Once the yeast has been added, the beer ferments for some time, and then is bottled or kegged, sometimes with the addition of bottling sugar to aid in carbonation, and sometimes (with kegs) through forced carbonation.

Product Features

In embodiments, this invention may be packaged variously as a small automated kitchen appliance, a larger, professional countertop unit, or a restaurant-grade industrial appliance. Such embodiments may be available in a variety of sizes, housing materials, colors and shapes.

In embodiments, the step filter basket 114, fluids tank 116, and fermentor 118 may be available in different sizes, which directly affects possible batch size, allowing a varying amount ingredients and water to be added.

In embodiments, the step filter basket 114 may offer different numbers and sizes of compartments, allowing for the use of more/fewer brewing ingredients in a recipe.

In embodiments, the step filter basket 114 may contain special compartments that enable the use of liquid and/or powdered ingredients such as liquid or solid malt extract and brewing adjuncts. Compartment inserts, in embodiments, may also be used to change the size/shape of compartments without requiring the replacement of the entire Step Filter Basket. In embodiments, in-line instruments I1 and I2 in FIG. 4 may be incorporated that measure flow-rate, color, particles and other process variables useful in the beer-making process. A Flexible Brewing Instrument Interface (FBII) accommodates both the hardware and software interfacing of such instruments to the system.

In embodiments, the FBII also accommodates, Brewing Meta-Instruments (BMI) based on the incorporation of small digital cameras and image recognition software. In a preferred embodiment of this system fluid flows through several sections of clear polycarbonate or glass tubing. A camera with appropriate recognition software can detect conditions and measurements such as flow rate and line blockage, presence of bubbles and particulates, wort color, and system leaks.

In embodiments, the Instruments in FIG. 4 may be single Instruments, or multiple instruments connected to Multi-Instrument Manifolds (MIMs). MIMS may host a collection of instruments, added by the manufacturer and/or the end-user seamlessly through a standard plumbing fitting such as, in a preferred embodiment, a ½" NPT threaded fitting. Each MIM may accommodate 2 or more in-line Instruments, and, in a preferred embodiment, allows for the flexible addition and removal of included and aftermarket instruments.

In embodiments, the system may incorporate in-line instruments including temperature sensors, flow-valves, and refractometers that enable a feedback-driven brewing process. Such a process, in contrast to conventional brewing processes, can carry out brewing in an automated fashion based on measured process parameters, not just time. A primary use of the refractometer Instrument, for example, is to allow constant measurement of the amount of sugar in solution during mashing. From this measurement, we can determine when mashing is complete based on direct measurement instead of based on a calculated time duration, as is typical of conventional brewing.

In various embodiments, the heat exchanger 132 loop may afford faster or slower heating due to larger (higher wattage) Heating elements and/or more efficient heat exchangers.

In various embodiments, the heating element 130 is capable of performing a dual function as a heater or chiller, allowing the heating loop on the left side of the heat exchanger to transfer heat or cold to the fluid passing through the right side of the heat exchanger. One embodiment of such dual-use heat exchanger is based on a thermoelectric plate which, when supplied with current in one direction heats, and in the reverse polarity, cools.

In various embodiments, a control unit incorporating a bit-mapped graphical LCD may depict a symbolic representation of the system and show fluid flow, heat, temperature and process steps. Such a control unit may also display photorealistic representations of the system and brewing process as it progresses.

In various embodiments, the control unit may communicate with external devices such as a PCs, iPads or other tablets or iPhones for user control inputs and monitoring. These devices then effectively become the control unit's Display and Inputs.

In one preferred embodiment the fermentor into which wort is dispensed at the end of the brewing process is a Filter Keg (FK) which enables fermentation and conditioning/storage in the same vessel. The FK contains, in embodiments, a mesh filter covering its dip-tube, which allows for the filtration of beer dispensed through outlet post to which the dip-tube is attached.

What is claimed is:

1. A brewing system, comprising:
   a. a vessel, constructed to retain water and beer wort;
   b. a filter basket designed to drain into said retaining vessel comprising a bottom wall defining a set of apertures permitting fluid flow into said vessel, an exterior wall set, adapted to retain fluid within the filter basket at levels below a top fluid level, and a set of interior walls, configured to define a single largest open compartment, taking up at least one quarter of the area of said filter basket and, and a set of additional open compartments;
   c. a tube connected to and in fluid communication to said retaining vessel
   d. a fluid distribution manifold connected to said tube and adapted to controllably direct fluid from said tube into a selected open compartment;
   e. a heat source positioned to be in thermal communication to fluids in said system;
   f. a pump adapted to pump fluid through said tube;
   g. a control unit in communication with and controlling said pump, said heater and said fluid distribution manifold; and
   h. whereby malted barley can be placed in said single largest open compartment, water placed in said retaining vessel, and hops placed in one of said additional open compartments, said water then pumped through said tube by said pump, heated by said heat source, and directed by said fluid distribution manifold to cause hot water to flow through said malted barley, and into said vessel, and later to flow through said compartment containing said hops and into said vessel, thereby creating hot hops-infused beer wort.

2. The system of claim 1, wherein said filter basket is a step filter basket, wherein said interior walls permit fluid flow between compartments at fluid levels below said top fluid level.

3. The system of claim 2, wherein said interior walls permit fluid flow between a subset of adjacent compartments at varying fluid levels, so fluid will flow over different compartment contents at different times during brewing.

4. The system of claim 2, wherein said fluid distribution manifold is in the form of a moveable fluid outlet responsive to said control unit to move to a commanded position above a selected compartment.

5. The system of claim 3, wherein said subset of adjacent compartments is arranged to enable a sequence of adjunct additions, with compartments designated for later adjunct additions configured to permit fluid flow into compartments designated for earlier additions.

6. The system of claim 5 wherein said control unit directs fluid flow sequentially to said compartments in predetermined order of adding of adjuncts.

7. The brewing system of claim 1, wherein said control unit includes a data entry panel whereby a user can input commands.

8. The brewing system of claim 1, wherein said heat source is a heat exchanger that is, more specifically, in thermal contact with said fluids in said tube.

* * * * *